(12) United States Patent
Lee

(10) Patent No.: US 6,254,044 B1
(45) Date of Patent: Jul. 3, 2001

(54) TABLETOP TRIPOD

(76) Inventor: Li-Hwa Lee, 13th Fl., No. 94, Sec. 1, Hsin-Tai Wu Rd., Hsichih Chen, Taipei Hsien (TW)

( * ) Notice: Subject to any disclaimer, the term of this patent is extended or adjusted under 35 U.S.C. 154(b) by 0 days.

(21) Appl. No.: 09/484,333

(22) Filed: Jan. 18, 2000

(51) Int. Cl.[7] ...................................................... F16M 11/02
(52) U.S. Cl. ................................ 248/177.1; 248/163.1; 248/166; 248/171; 248/181.1; 248/181.2; 248/187.1
(58) Field of Search ............................... 248/177.1, 163.1, 248/166–169, 171, 436, 181.1, 181.2, 182.1

(56) References Cited

U.S. PATENT DOCUMENTS

| | | | |
|---|---|---|---|
| 2,670,228 | * | 2/1954 | Pagliuso ................................. 287/87 |
| 4,324,477 | * | 4/1982 | Miyazaki ............................. 354/293 |
| 4,629,150 | * | 12/1986 | O'Callaghan ......................... 248/167 |
| 5,043,750 | * | 8/1991 | Yamaguchi ............................. 354/81 |
| 5,503,357 | * | 4/1996 | Johnson et al. .................... 248/188.5 |
| 5,551,655 | * | 9/1996 | Berger ................................... 248/168 |
| 5,626,379 | * | 5/1997 | Scott ..................................... 294/143 |
| 5,662,296 | * | 9/1997 | Wu ......................................... 248/96 |
| 5,823,491 | * | 10/1998 | Lindsay et al. ....................... 248/169 |

* cited by examiner

Primary Examiner—Leslie A. Braun
Assistant Examiner—A. Joseph Wujciak
(74) Attorney, Agent, or Firm—Kolisch Hartwell Dickinson McCormack & Heuser

(57) ABSTRACT

A tabletop tripod is disclosed. The tripod has a base with a cavity defined in one side thereof, a stationary leg fixedly mounted on the base, two pivoting legs pivotally mounted on the base each having a driving means engaging each other received in the cavity of the base and an equipment base with a threaded stud extending upwardly therefrom pivotally mounted on the base to attach a camera. In such an arrangement, the two pivoting legs can be opened up simultaneously to make using the tripod more convenient.

6 Claims, 6 Drawing Sheets

TABLETOP TRIPOD

BACKGROUND OF THE INVENTION

1. Field of the Invention

The present invention relates to a tabletop tripod, and more particularly to a tripod convenient to operate.

2. Description of Related Art

A tripod in accordance with the prior art comprises a base, three legs pivotally mounted on the base and a base to hold a camera. When the legs are rotated with respect to the base, the tripod can be opened up and securely support a camera on the ground or a table. When the legs are closed relative to the base, the tripod can be moved or store conveniently. However, all legs must be individually opened up relative to the base when the conventional tripod is used. This can be inconvenient when using the conventional tripod. In addition, the base must have a fixture corresponding to each leg to stop and position it. Therefore, this will increase the complexity of the tripod.

To overcome these shortcomings, the present invention tends to provide an improved tripod to mitigate or obviate the aforementioned problems.

SUMMARY OF THE INVENTION

The main objective of the invention is to provide a tripod having a base, a stationary leg fixedly mounted on the base and two pivoting legs mounted on the base each having a connecting structure engaging each other, so that all the legs of the tripod can be opened up or folded simultaneously so as to be convenient during use.

Other objects, advantages and novel features of the invention will become more apparent from the following detailed description when taken in conjunction with the accompanying drawings.

DETAILED DESCRIPTION OF PREFERRED EMBODIMENT

Figure 1:
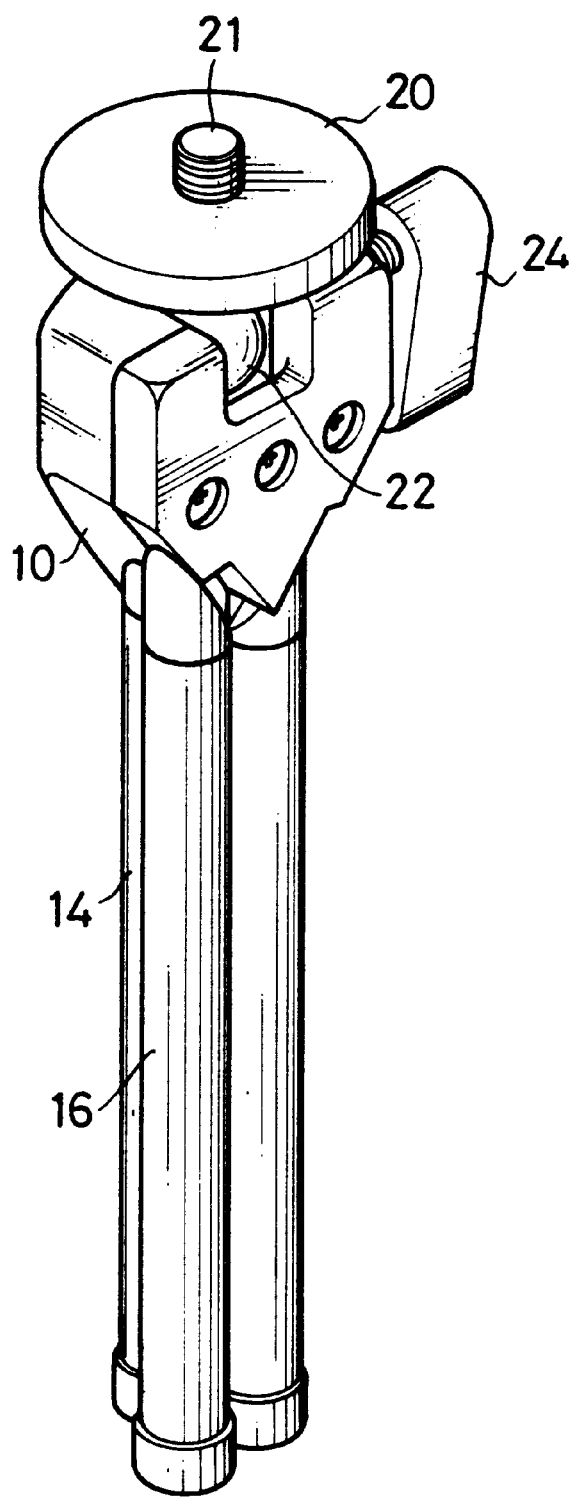
FIG. 1 is a perspective view of a tabletop tripod in accordance with the present invention.
Figure 2:
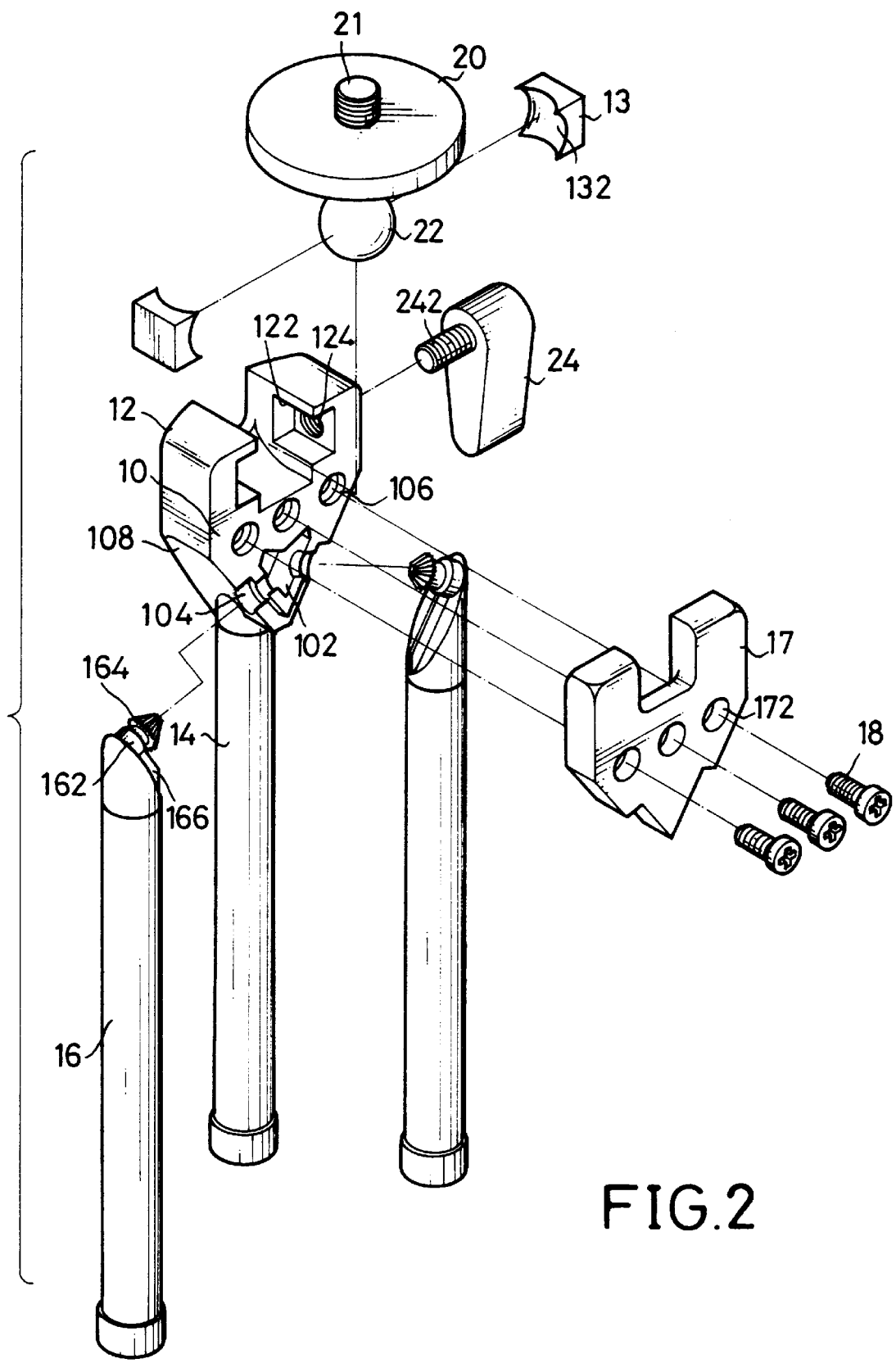
FIG. 2 is an exploded perspective view of the tabletop tripod in FIG. 1.

Referring to FIGS. 1 and 2, a tabletop tripod in accordance with the present invention comprises a base (10), a stationary leg (14) fixedly connected to the base (10) and two pivoting legs (16) attached to the base (10).

Each pivoting leg (16) has a driving means engaged with each other and mounted on one distal end of the leg (16). In particular, each pivoting leg (16) has a stub (162) protruding therefrom. Each stub (162) has a bevel gear (164) mounted thereon engaging each other.

The base (10) provides the means of connecting the legs (14, 16) and connecting and adjusting the equipment base (20). A cavity (102) is defined in one side of the base (10) to receive the bevel gears (164) of the pivoting legs (16). The base (10) has two through holes (104) connecting to the cavity (102) for receiving the stub (162) of the corresponding pivoting leg (16), such that each pivoting leg (16) can pivotally rotate relative to the base (10). In addition, the base (10) has at least one threaded hole (106) defined on the side with the cavity (10) formed thereon. A cover (17) with a bore (172) corresponding to each threaded hole (106) is securely attached to said base (10) by means of bolts (18) extending the bore (172) and screwing onto the corresponding threaded hole (106) so as to seal the cavity (102).

Referring to FIGS. 2 and 4–6, when the user holds any two of the legs (14,16) and spreads them, at least one of the two pivoting legs (16) is held by the user. Therefore, the pivoting leg (16) which the user holds will pivotally rotate corresponding to the base (10), and the other pivoting leg (16) will rotate corresponding to the base (10) due to the bevel gears (164). Thus, the legs (14, 16) can be opened up simultaneously so as to form a supporting area to securely support the base (10) on a table or the ground. Furthermore, an oblique face (166) is formed on the distal end of each pivoting leg (16) with the bevel gear (164). A corresponding oblique face (108) is formed on the base (10). Such that, the pivoting legs (16) will be securely positioned as the oblique faces (108, 166) of the base (10) and legs (16) abut each other.

Figure 3:
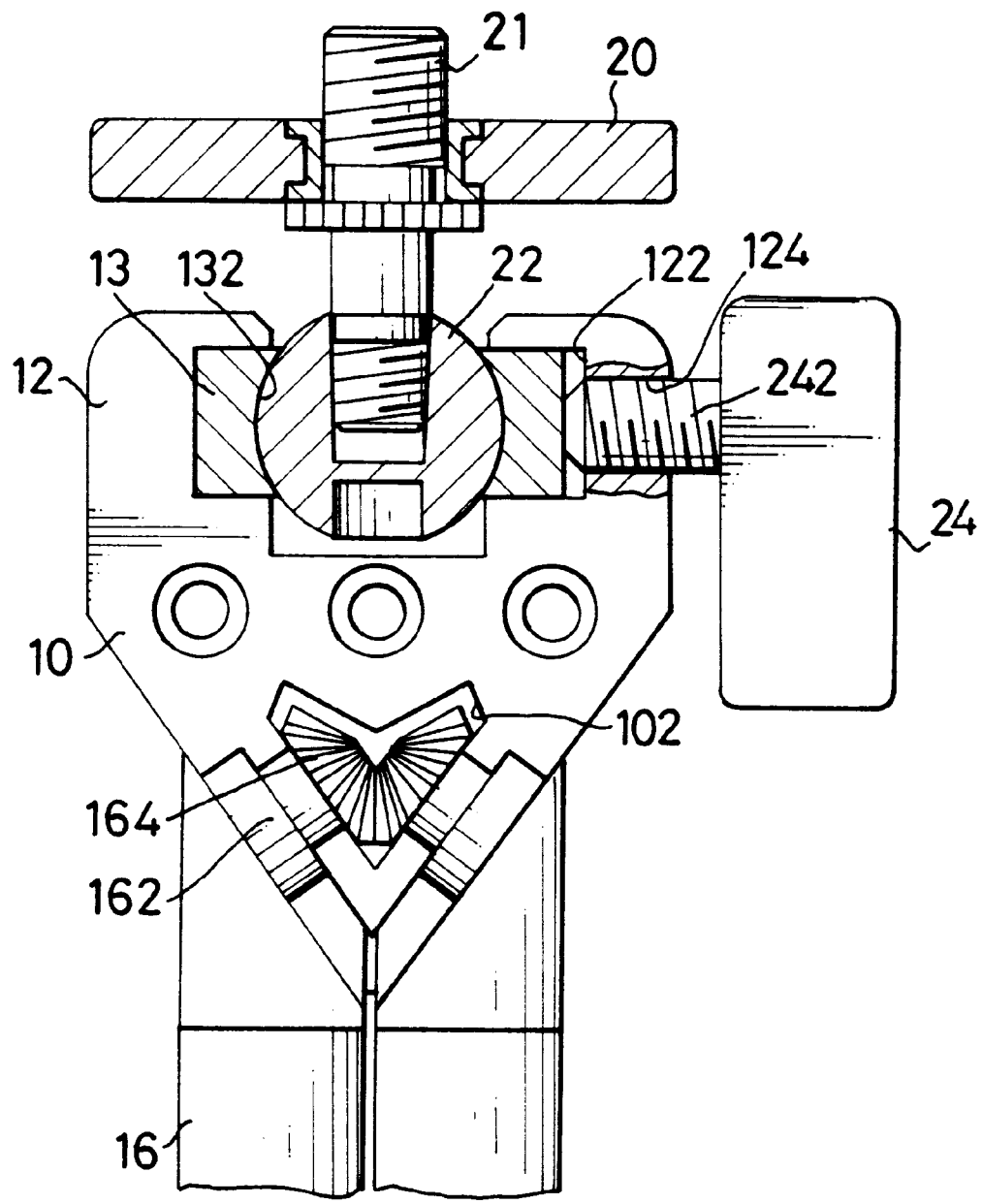
FIG. 3 is a partial front plan view in partial section of the tabletop tripod in FIG. 1.
Figure 4:
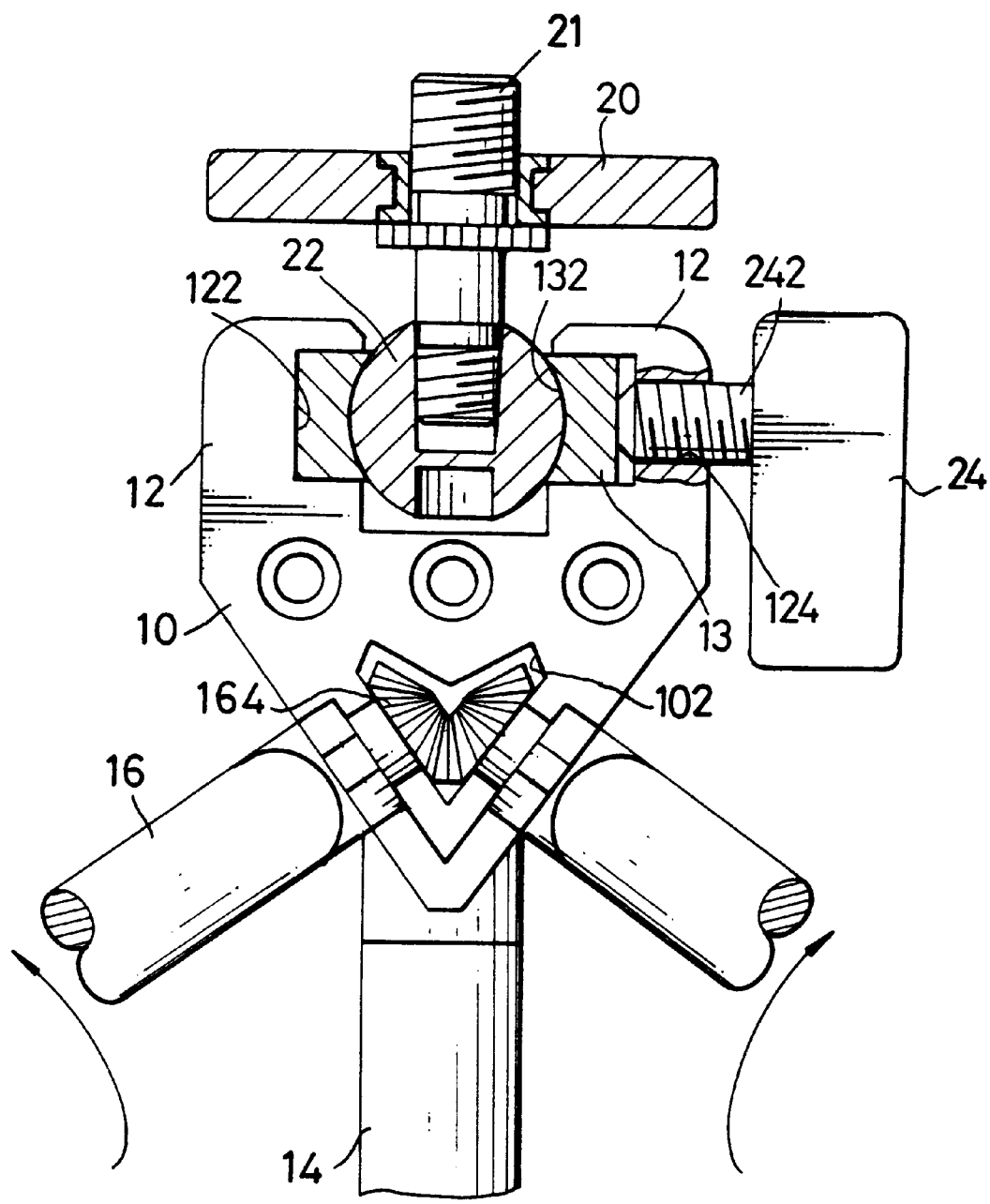
FIG. 4 is a front plan view in partial section of the tabletop tripod in FIG. 1 in operation.
Figure 5:
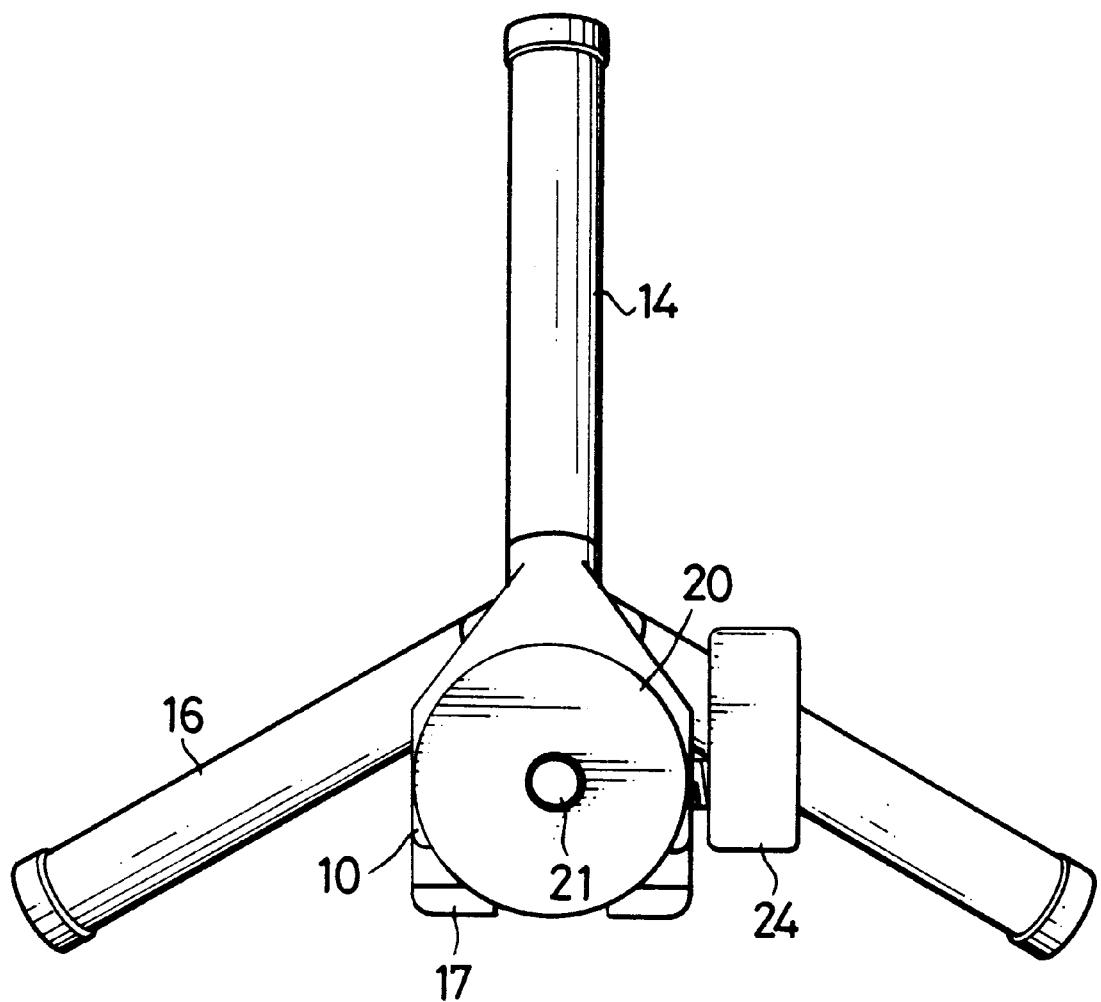
FIG. 5 is a top plan view of the tabletop tripod in FIG. 1 in use.
Figure 6:
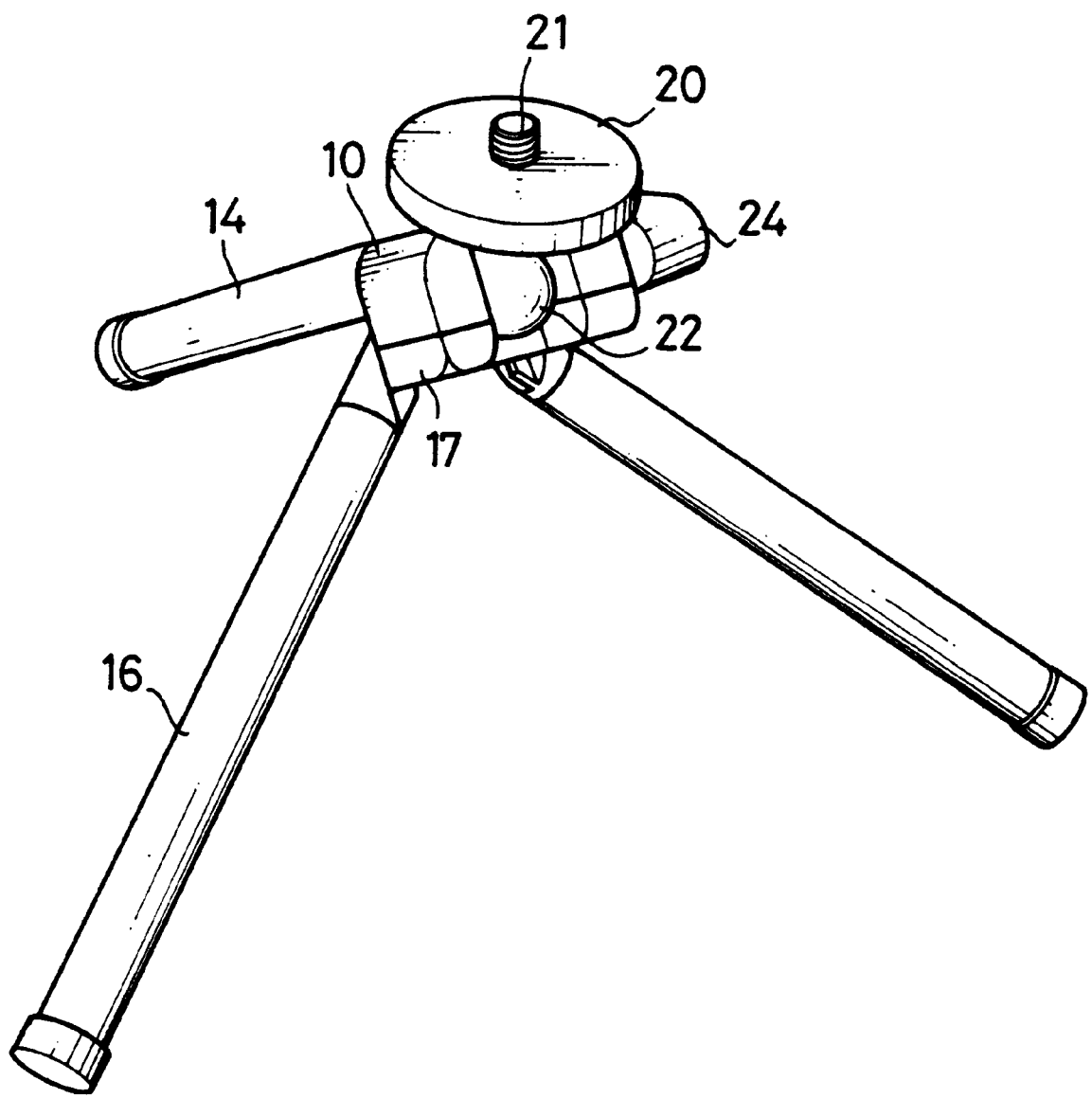
FIG. 6 is a perspective view of the tabletop tripod of FIG. 1 in use.

Referring to FIGS. 2 and 3, the equipment base (20) is mounted between two upward protrusions (12) in the base (10). A recess (122) is formed on the inside of each protrusion (12) to hold a compression block (13). Each compression block (13) has a concave face (132) defined on the side facing the other compression block (13). The equipment base (20) has a threaded stud (21) extending upwardly to attach a camera, telescope or other equipment. A ball (22) is fixedly connected to the equipment base (20) and is mounted between the concave faces (132) of the compression blocks (13), such that the equipment base (20) can be adjusted to virtually any desired position.

To lock the equipment base (20) in a desired position, a locking knob (24) with a threaded stub (242) is screwed into a threaded bore (124) defined in one of the protrusions (12). The threaded stub (242) abuts and presses the corresponding compression blocks (13), thereby squeezing and holding the ball so that the equipment base (20) can be positioned in a desired position and angular.

When the legs (14,16) are opened up, the base (10) will be inclined relative to the face of the table or the ground. Then, the equipment base (20) can be rotated relative to the base (10) by loosening the locking knob (24), moving the equipment base (20) and tightening the locking knob (24) so as to keep the equipment base (20) in a horizon plane.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A tabletop tripod comprising:
   a base having a cavity defined in one side face thereof, two protrusions extending upwardly therefrom, a recess defined in each of the protrusions and a threaded bore defined in one of said protrusions;

a first compression block and a second compression block respectively received in said recess of said protrusion, said first and second blocks having a concave face defined to correspond to each other;

an equipment base pivotally mounted on said base and having a threaded stud extending upwardly therefrom;

a locking knob having a threaded stub extending through said threaded bore of said base;

a ball fixedly attached to said equipment base and mounted between said concave faces of said two compression blocks;

a stationary leg fixedly mounted on said base; and two pivoting legs pivotally mounted on said base and each having a driving means received in said cavity of said base and engaged with each other.

2. The tabletop tripod as claimed in claim 1, wherein said driving means mounted on each of said pivoting legs is a bevel gear.

3. The tabletop tripod as claimed in claim 2, wherein each pivoting leg has a stub on which said bevel gear is mounted.

4. The tabletop tripod as claimed in claim 3, wherein said base has a through hole defined communicate with said cavity for receiving said stub of each pivoting leg.

5. The tabletop tripod as claimed in claim 1 further comprising a cover securely attached to said base to seal said cavity; and at least one bore is defined in said cover, said base has threaded hole corresponding to each bore of said cover, and a bolt extends through each bore and screws into the corresponding threaded hole.

6. The tabletop tripod as claimed in claim 5, wherein each pivoting leg has a first oblique face formed on a distal end where said driving means is mounted, and said base has a second oblique face formed to correspond to said first oblique face of each pivoting leg.

* * * * *